(12) United States Patent
Lamela

(10) Patent No.: US 6,513,399 B2
(45) Date of Patent: Feb. 4, 2003

(54) DUAL POWER FLOW COUNTER SHAFT TRANSMISSION

(75) Inventor: Anthony J. Lamela, Gilberts, IL (US)

(73) Assignee: Case Corp., Racine, WI (US)

( * ) Notice: Subject to any disclaimer, the term of this patent is extended or adjusted under 35 U.S.C. 154(b) by 15 days.

(21) Appl. No.: 09/750,959

(22) Filed: Dec. 28, 2000

(65) Prior Publication Data

US 2002/0083785 A1 Jul. 4, 2002

(51) Int. Cl.$^7$ ................................................ F16H 3/08
(52) U.S. Cl. .............................. 74/331; 74/360; 74/364
(58) Field of Search ........................ 74/331, 364, 360, 74/363

(56) References Cited

U.S. PATENT DOCUMENTS

| | | | |
|---|---|---|---|
| 3,971,268 A | * | 7/1976 | Murakami et al. ............. 74/331 |
| 4,201,098 A | * | 5/1980 | Harvey ......................... 74/331 |
| 4,635,495 A | * | 1/1987 | White .......................... 74/331 |
| 4,823,639 A | * | 4/1989 | Krause et al. ................. 74/331 |
| 4,846,009 A | | 7/1989 | Paluska, Jr. |

* cited by examiner

Primary Examiner—Matthew C. Graham
(74) Attorney, Agent, or Firm—A. N. Trausch

(57) ABSTRACT

A powershift transmission for a work vehicle is disclosed having two modes of applying power: a direct connection through a series of gears, and a connection through a torque converter integral with the transmission. The two paths branch at the input shaft, on which is mounted and which drives a torque converter that has a gear coupled to its output. Another gear on the input shaft is connected to that shaft by a hydraulic clutch. When the clutch is engaged, the transmission provides several high-range forward gear ratios through a direct gear drive. When that clutch is disconnected, the torque converter supplies power to the transmission to low forward and low reverse ranges of gear ratios. The transmission includes a first countershaft, on which are mounted a reverse master clutch engaged in all reverse gear ratios) and a forward low range clutch, which is engaged in the low range of forward gear ratios. The reverse master clutch couples the countershaft directly to the output shaft. The forward low-range clutch connects the countershaft to a second countershaft. The second countershaft and the output shaft each has two speed clutches. Only one of these speed clutches is engaged in any individual gear ratio. The output shaft is also engaged to a mechanical front wheel drive output shaft via a clutch. This output shaft is engaged via that clutch and counter-rotates with the output shaft to drive the front wheels or tracks of the vehicle.

11 Claims, 1 Drawing Sheet

DUAL POWER FLOW COUNTER SHAFT TRANSMISSION

FIELD OF THE INVENTION

This invention relates to a dual power flow counter shaft transmission for a heavy duty work vehicle, and more particularly to a dual power flow counter shaft transmission having a plurality of forward and reverse speeds utilizing constant mesh gearing, a torque converter, and a plurality of fluid actuated rotating disc-type clutches so constructed and arranged as to provide maximum compactness and speed reduction ratio flexibility.

BACKGROUND OF THE INVENTION

Counter shaft transmissions having a plurality of speed ratios in each direction of operation have been found to be particularly useful in the drive line of heavy duty work vehicles, such as wheel loaders, rubber tired log skidders and lift trucks. These transmissions are advantageous in that a plurality of rotating disc-type clutches and associated continually meshing gears can be so positioned on the usual parallel shafts as to allow considerable design flexibility and adaptability to the elevational drop requirement between the input and output axes.

One of the problems with these prior counter shaft transmissions is that they provide only a limited number of fixed gear ratios between the input and the output shaft. When operating at low speeds, these fixed gear ratios require a significant and abrupt change as one gear ratio is disengaged and the other gear ratio is engaged. While some of this abruptness can be eliminated by careful design of the clutch valve controllers, it cannot all be eliminated. In addition, by providing several closely spaced low range gear ratios, the work vehicle will spend a large amount of time shifting between those ratios to achieve the optimum gear ratio.

Accordingly, what is needed is a structurally simple, constant mesh counter shaft transmission that includes a torque converter that is engaged in a low range of gear ratios and is disengaged in a high range of gear ratios when the vehicle is operated at high speeds over the road.

SUMMARY OF THE INVENTION

The present invention is directed to providing such a transmission. In one embodiment of the invention, there is provided a dual power flow counter shaft transmission for a work vehicle that has an input shaft rotationally coupled to and driven by the vehicles engine. The input shaft has a first gear mounted for free rotation thereon and a first hydraulic clutch disposed to connect the first gear to the input shaft for conjoint rotation. A second gear is also mounted on the input shaft for free rotation thereon. A torque converter is disposed to couple the input shaft to the second gear to transmit power from the input shaft through the torque converter to the second gear, thereby driving the second gear.

A first counter shaft is also provided in the transmission and has a third gear mounted for free rotation thereon, a fourth gear mounted for free rotation thereon, and a fifth gear mounted for conjoint rotation with the first counter shaft. A second clutch is provided to connect the third gear with the first counter shaft. A third clutch is provided to connect the fourth gear to the first counter shaft. The first gear and the fourth gear are engaged to each other in continuous mesh. The fifth gear and the second gear are also engaged to each other in continuous mesh.

A second counter shaft is provided having a sixth gear mounted thereon for free rotation. A seventh gear is mounted on the third counter shaft for conjoint rotation. An eighth gear is mounted on the third counter shaft for conjoint rotation. A ninth gear is mounted on the third counter shaft for free rotation.

A fourth clutch is disposed on the second counter shaft to connect the sixth gear with the second counter shaft for conjoint rotation therewith. A fifth clutch is provided on the second counter shaft to connect the ninth gear with the second counter shaft for conjoint rotation therewith. The eighth gear and the fourth gear are in continuous meshing engagement.

A first output shaft is provided having a tenth gear mounted thereon for conjoint rotation. An eleventh gear and twelfth gear are mounted thereon for free rotation (with respect to the first output shaft) and for conjoint rotation (with respect to each other). A thirteenth gear is mounted on the output shaft for free rotation thereon and a fourteenth gear is mounted on the first output shaft for conjoint rotation therewith. A sixth clutch is disposed on the first output shaft to connect the eleventh and twelfth gears, which always rotate conjointly, to the first output shaft for conjoint rotation therewith. A fifteenth gear is mounted on the first output shaft for conjoint rotation therewith. A seventh clutch is disposed on the first output shaft to connect the thirteenth gear with the first output shaft for conjoint rotation therewith. The third gear on the first counter shaft is engaged with the twelfth gear on the first output shaft for continuous meshing engagement. The fourth gear on the first counter shaft is engaged to the eighth gear on the second counter shaft for continuous meshing engagement. The sixth gear on the second counter shaft is engaged with the tenth gear on the first output shaft for continuous meshing engagement. The seventh gear on the second counter shaft is connected to the eleventh gear on the first output shaft for continuous meshing engagement. The eighth gear on the second counter shaft is coupled to the thirteenth gear on the first output shaft for continuous meshing engagement. The ninth gear on the second counter shaft is coupled to the fourteenth gear on the first output shaft for continuous meshing engagement.

A mechanical front wheel drive output shaft is also provided having a sixteenth gear mounted for free rotation thereon. An eighth clutch is provided on the mechanical front wheel drive output shaft to connect the sixteenth gear to that shaft for conjoint rotation therewith.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
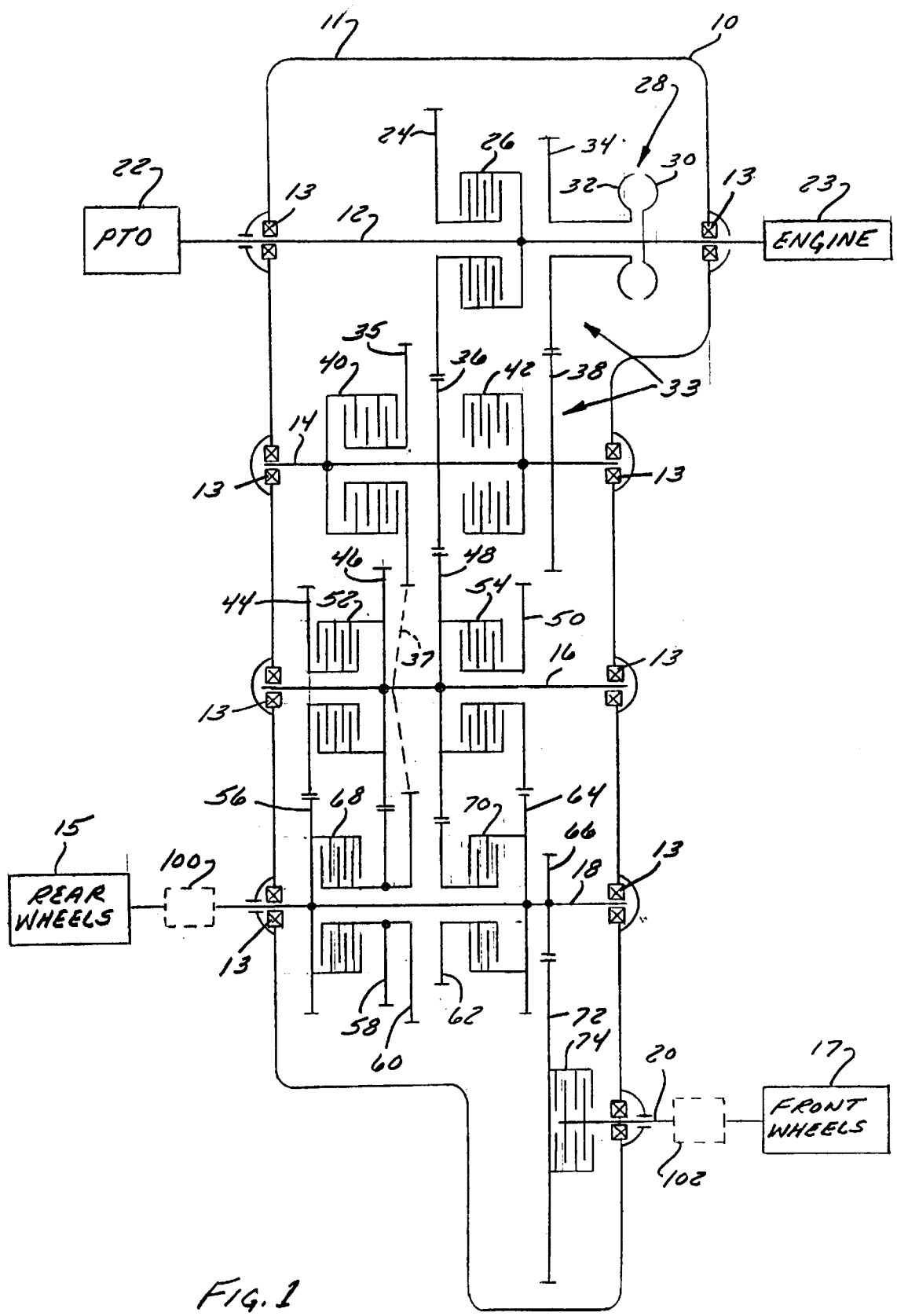
FIG. 1 is a diagrammatic, developed, but substantially side elevational view of an eight-speed forward, four-speed reverse dual power flow counter shaft transmission constructed in accordance with the present invention.

FIG. 1 shows the layout of gears, shafts, and clutches of transmission 10. The transmission shafts are supported in transmission case 11 on bearings 13 in a conventional manner. Transmission 10 selectively drives rear drive wheels or tracks 15, as well as a mechanical front wheel (or track) drive 17. While not shown, the wheels or tracks can be, and preferably are, driven through additional drive elements 100, which may include transfer cases, rear differentials and simple reduction gear sets. Similar drive elements 102 may be disposed between MFD shaft 20 and front wheels or tracks 17. In the preferred embodiment, there are five (5) shafts, an input or first shaft 12, a first counter shaft 14, a second counter shaft 16, a first output shaft 18, and a mechanical front wheel drive output shaft 20. Input shaft 12 drives a power take off (PTO) or pump 22. The pump is a hydraulic pump and is used to provide auxiliary hydraulic fluid typically for implements attached to the vehicle. The PTO is similarly connected to an implement that is driven by a rotating shaft. The vehicle's engine 23 is rotationally coupled to and drives input shaft 12. A first gear 24 is fixed to shaft 12 for free rotation therewith. A hydraulic clutch, preferably a multi-plate clutch 26, is also mounted on input shaft 12. Clutch 26, when engaged, locks first gear 24 to shaft 12 so that they rotate conjointly. When clutch 26 is disengaged, input gear 24 can turn freely on the shaft. A torque converter 28 is also mounted on and driven by input shaft 12. The input side 30 of the torque converter is fluidly coupled to output side 32 of the torque converter in the conventional manner. A first gear of a drop gear set, shown in FIG. 1 as second gear 34, is also mounted on shaft 12 and is coupled to the output side 32 of the torque converter to rotate conjointly therewith. First gear 24 is driven by the engine 23 whenever the forward high range clutch 26 is engaged. Clutch 26, like all the other clutches in transmission 10, is designed to provide conjoint rotations, and not to slip for any extended period of time. Thus, gear 24 rotates at substantially the same speed as engine 23. Although we have not shown it in FIG. 1, one or more reduction gears could easily be disposed between engine 23 and input shaft 12 without violating the spirit of the present invention. Engine 23 also drives input side 30 of torque converter 28 which, in turn, is fluidly coupled to the output side 32 of the torque converter and drives it. Since the output side of the torque converter is fixed to and rotates conjointly with second gear 34, gear 34 rotates with the input shaft. Gear 34 is fluidly coupled to the input shaft whenever the forward high range clutch 26 is engaged. Unlike gear 24, gear 34 is fluidly coupled to engine 23, and therefore does not always rotate at the same speed as engine 23, as does gear 24. These two gears, both located on input shaft 12, provide the dual power flows for transmission 10. For the high range of forward gears, power flows from engine 23 through gear 24 and thence to the rest of the transmission and driven wheels or tracks. For the low range of forward gears and the reverse gears, power flows from the engine through torque converter 28 and to gear 34. From gear 34, this power is coupled to the remaining portions of the transmission. For this reason, clutch 26 is termed the "forward high range" clutch. When it is engaged, power is provided to the forward high range of gear ratios.

Transmission 10 also includes a first counter shaft 14 on which gears 35, 36 and 38 are mounted. Gear 35 is mounted on counter shaft 14 for free rotation thereon. Transmission 10 includes a second clutch 40 that is also mounted on counter shaft 14 and, when engaged, fixes third gear 35 to rotate conjointly with counter shaft 14. When clutch 40 is disengaged, gear 35 rotates freely about counter shaft 14. Clutch 40, when engaged, enables the transmission to provide all the reverse gear ratios. As shown by dotted lines 37, gear 35 is in continuous mesh with gear 60 on the output shaft. When clutch 40 is engaged, power flow bypasses the second counter shaft 16 and goes to output shaft 18, thus reversing the direction of rotation of output shaft 18. It is this reversal of rotation of the output shaft that causes the transmission, and hence the vehicle, to operate in reverse. For this reason, clutch 40 is called the "reverse clutch" or "reverse master clutch".

Gear 36 is also mounted on counter shaft 14 for free rotation therewith. A third clutch, clutch 42, is mounted on counter shaft 14 and, when engaged, fixes gear 36 to rotate conjointly with counter shaft 14. When clutch 42 is disengaged, gear 36 rotates freely about counter shaft 14. Clutch 42 is the forward low range clutch. When it is engaged transmission 10 can operate in a low range of forward gear ratios. Reverse clutch 40 and the forward low range clutch 42 are not simultaneously engaged in any of the gear ratios of transmission 10.

The second gear of the drop gear set, fifth gear 38, is mounted on counter shaft 14 to rotate conjointly therewith. Second gear 34 on input shaft 12 and fifth gear 38 on first counter shaft 14 together comprise drop gear set 33 and jointly serve to transfer the engine power from torque converter 28 to first counter shaft 14. Gears 34 and 38 are in constant meshing engagement at all times during transmission operation. In a similar fashion, gears 24 (on shaft 12) and 36 (on shaft 14) are also in constant meshing engagement.

Clutch 42 is called the "forward low range clutch" because when it is engaged, it enables the transmission to operate in the forward low range gear ratios. It is always engaged when the transmission is in these forward gear ratios.

Power from engine 23 goes through torque converter 28 to gear 34, the first gear of the drop gear set, which transmits power to the second gear of the drop gear set, gear 38. Since gear 38 is fixed to the first counter shaft 14, this causes counter shaft 14 to rotate the "gear" side of clutch 26, the forward high range clutch. However, clutch 26 is always disengaged when clutch 42 is engaged, thus permitting gear 29 to spin freely on shaft 12. Power is transmitted from gear 38 to counter shaft 14 and thence through clutch 42 to gear 36. This power flow provides all the forward low range gear ratios. All of these low range gear ratios therefore couple the engine to the wheels or tracks through torque converter 28. Once engine power has been supplied to gear 36 in this manner, gear 36 transmits the power to shaft 16 through gear 48 with which it continuously meshes.

Referring now to second counter shaft 16, a sixth gear, gear 44 is mounted on second counter shaft 16 for free rotation thereon. A seventh gear 46 is also mounted on second counter shaft 16 for conjoint rotation therewith. An eighth gear 48 is mounted on second counter shaft 16 for conjoint rotation therewith. A ninth gear 50 is mounted on second counter shaft 16 for free rotation thereon.

A fourth transmission clutch 52 is mounted on second counter shaft 16 to connect sixth gear 44 to shaft 16 for conjoint rotation therewith. A fifth clutch 54 is mounted on second counter shaft 16 to connect ninth gear 50 to shaft 16 for conjoint rotation therewith. Eighth gear 48 is in continuous meshing engagement with fourth gear 36. Second countershaft 16 receives power from engine 23 in three different ways. In each of the forward gear ranges, the high range through gear 24 and gear 36, and the low range through gear 34, gear 38 and thence to gear 36, counter shaft 16 is driven by gear 48 which is in constant meshing engagement with gear 36 on first counter shaft 14. Thus, in all forward gear ratios, second counter shaft 16 receives power through gear 48. For the low range forward gear ratios, the power goes through torque converter 28. For the high range of gear ratios, power is transmitted through clutch 26. In the high range of forward gears, clutch 42 is not engaged, and hence gear 36 rotates freely on shaft 14 and serves merely to transfer power from gear 24 to gear 48. In the forward lower range of gear ratios, clutch 42 is engaged and serves to transmit power from shaft 14 to gear 36 and thence to shaft 16 through gear 48 with which it continuously meshes.

Referring now to first output shaft 18, a tenth gear 56 is mounted on output shaft 18 for conjoint rotation therewith. An eleventh gear 58 is mounted on output shaft 18 for free rotation therewith. A twelfth gear 60 is mounted on output shaft 18 for free rotation therewith. Twelfth gear 60 is also fixed to eleventh gear 58 such that gears 58 and 60 rotate conjointly at all times. A thirteenth gear 62 is mounted on output shaft 18 for free rotation therewith. A fourteenth gear 64 is mounted on output shaft 18 for conjoint rotation therewith. A fifteenth gear 66 is mounted on output shaft 18 for conjoint rotation therewith.

A sixth transmission clutch 68 is mounted on output shaft 18 to connect eleventh gear 58 and twelfth gear 60 to output shaft 18 for conjoint rotation therewith. A seventh clutch 70 is mounted on output shaft 18 to connect thirteenth gear 62 to output shaft 18 for conjoint rotation therewith.

Tenth gear 56 on output shaft 18 is coupled to sixth gear 44 on second counter shaft 16 for continuous meshing engagement therewith. Eleventh gear 58 on output shaft 18 is coupled to seventh gear 46 on counter shaft 16 for continuous meshing engagement therewith. Twelfth gear 60 on output shaft 16 is engaged with third gear 35 on first counter shaft 14 for continuous meshing engagement therewith. Thirteenth gear 62 on output shaft 18 is connected to eighth gear 48 on second counter shaft 16 for continuous meshing engagement therewith. The fourteenth gear 64 on output shaft 18 is connected to ninth gear 50 on second counter shaft 16 for continuous meshing engagement therewith.

We will now describe the engagement of the speed clutches to provide each of the forward and reverse gear ratios. The speed clutches are the two clutches, 52 and 54 on shaft 16 and 68 and 70 on shaft 18. Clutch 52 is the first and fifth gear clutch. Clutch 54 is the second and sixth gear clutch. Clutch 68 is the third and seventh gear clutch, and clutch 70 is the fourth and eighth gear clutch.

Starting with the forward gear ratios and going from the lowest gears to the highest gears, the power flow in first gear forward is as follows. First, clutch 42, the forward low range clutch, is engaged. Power flows from the engine through the torque converter and the drop gear set 33 to shaft 14. With clutch 42 engaged, the fourth transmission gear, gear 36 rotates conjointly with shaft 14. Gear 36 is in constant meshing engagement with eighth gear 48 on shaft 16. Thus, for any of the forward low range gear ratios, shaft 16 is driven through the torque converter.

With first/fifth gear clutch 52 engaged, gear 44 rotates together with driven shaft 16 and transmits its power to output shaft 18 through gear 56 with which it is in constant meshing engagement. Gear 56 is fixed to shaft 18 and therefore rotates the output shaft.

For the second gear, second/sixth gear clutch 54 is engaged and the other three speed range clutches are disengaged. Again, shaft 16 is driven by gear 48. Gear 50 rotates jointly with shaft 16 when clutch 54 is engaged. Gear 50 also meshes continuously with gear 64 on output shaft 18. Since gear 64 is fixed to rotate conjointly with output shaft 18, this causes output shaft 18 to rotate.

For the third gear, third/seventh gear clutch 68 is engaged and all the other speed clutches (52, 54, 70) are disengaged. Power is transmitted, again, from gear 48 to shaft 16, thence to gear 46 which is fixed on shaft 16 and to gear 58 with which gear 46 is in continuous meshing engagement. With clutch 68 engaged, gear 58 rotates conjointly with shaft 18. Thus, shaft 18 is driven by shaft 16.

Finally, for fourth gear, fourth/eighth gear clutch 70 is engaged to lock gear 62 with respect to shaft 18. Power flows from gear 48 directly to gear 62 with which it is in constant meshing engagement. Clutch 70 fixes gear 62 with respect to output shaft 18 and thus causes output shaft 18 to rotate conjointly with gear 62.

The forward high range gear ratios, gear ratios five through eight, are also driven in a similar manner through gear 48. For the high range of forward gear ratios, clutch 26 on the input shaft is engaged, thus causing gear 24 to rotate conjointly with input shaft 12. This power is transmitted from gear 24 to gear 36, which is in constant meshing engagement with gear 24 and thence to gear 48 which is in constant meshing engagement with gear 36. Clutch 42 is always disengaged in these gear ratios, permitting shaft 14 to spin freely driven by drop gear set 33. In this manner power is transmitted to shaft 16 through gear 48 and the higher range forward gears (gear ratios 5–8) are engaged in the same manner as the lower range forward gear ratios (gears 1–4) described immediately above.

For the reverse gear ratios, power is not supplied directly to shaft 16 through gear 48, but is supplied through reverse master clutch 40 on shaft 14 through gear 35 and thence to gear 60 on output shaft 18 with which gear 35 is in continuous engagement. This "bypassing" of shaft 16 and the continuous meshing engagement of gears 35 and 60 are indicated by dashed line 37 in FIG. 1.

This bypassing of shafts 14, 16, and 18 do not lie in the same plane, as the FIGURE would seem to show, but are in a substantially triangular axial relationship. Thus, the distance between shaft 14 and 16 is generally the same as the distance between shafts 16 and 18, which is generally the same as the distance between shaft 18 and shaft 14. These relationships have been "flattened" in FIG. 1 to permit the easy illustration of the gear shafts and clutches of transmission 10.

In the lowest reverse gear ratio, first gear reverse, power is transmitted through torque converter 28 through the drop gear set and thence to shaft 14. Reverse clutch 40 on shaft 14 is engaged to transfer power to gear 35 and thence to gear 60 on shaft 18. Power flows from gear 60 to gear 58 with which it always rotates conjointly, and thence to gear 46. Clutch 52 is engaged, and therefore gear 44 is fixed with respect to shaft 16 and drives gear 56 fixed on output shaft 18, causing output shaft 18 to rotate.

In a similar fashion, in the second reverse gear, gear 58 drives gear 46 which causes shaft 16 to rotate. Unlike first gear reverse, clutch 54, the second gear clutch, is the only speed clutch engaged, causing gear 50 to rotate conjointly with shaft 16. Since gear 50 is in continuous meshing engagement with gear 64, which, in turn, is fixed to rotate conjointly with shaft 18, gear 50 causes output shaft 18 to rotate.

For the third reverse gear, clutch 68 is engaged, causing gear 60 to be fixed with respect to shaft 18. Since gear 60 is driven by gear 35 on shaft 14, shaft 18 is caused to rotate.

The final gear ratio, fourth gear reverse, is provided by engaging clutch 70 on shaft 18. Power transmitted to gear 60 is transmitted to gear 58 which rotates shaft 16 through gear 46. Gear 48, in turn, is fixed to shaft 16 and is in continuous meshing engagement with gear 62 on shaft 18. Clutch 70 fixes gear 62 to rotate conjointly with shaft 18 thereby causing output shaft 18 to rotate.

The description above explains how each of the gear ratios are provided, and how power flows in dual paths through transmission 10.

The remaining shaft in the transmission is the mechanical front wheel drive output shaft 20. Sixteenth gear 72 is mounted on MFD output shaft 20 for free rotation therewith. Eighth clutch 74 is mounted on shaft 20 to connect sixteenth gear 72 to output shaft 20 for conjoint rotation.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A countershaft transmission comprising:
   a. an input shaft having
      i. a first gear mounted thereon for free rotation,
      ii. a first clutch adaptable to connect the first gear to the input shaft,
      iii. a second gear mounted thereon, and
      iv. a torque converter mounted thereon and drivingly coupled to the second gear;
   b. a first countershaft having
      i. a third gear mounted thereon for free rotation,
      ii. a second clutch adaptable to connect the third gear to the first countershaft,
      iii. a fourth gear mounted thereon for free rotation,
      iv. a third clutch adaptable to connect the fourth gear to the first countershaft, and
      v. a fifth gear mounted thereon for conjoint rotation;
   c. a second countershaft having
      i. a sixth gear mounted thereon for free rotation,
      ii. a fourth clutch adaptable to connect the sixth gear to the second countershaft,
      iii. a seventh gear mounted thereon for conjoint rotation,
      iv. an eighth gear mounted thereon for conjoint rotation,
      v. a ninth gear mounted thereon for free rotation,
      vi. a fifth clutch adaptable to connect the ninth gear to the second countershaft;
   d. an output shaft having
      i. a tenth gear mounted thereon for conjoint rotation,
      ii. eleventh and twelfth gears mounted thereon for free rotation with respect to the output shaft and for conjoint rotation with each other,
      iii. a sixth clutch adaptable to connect the eleventh and twelfth gears to the output shaft,
      iv. a thirteenth gear mounted thereon for free rotation,
      v. a seventh clutch adaptable to connect the thirteenth gear to the output shaft,
      vi. a fourteenth gear mounted thereon for conjoint rotation,
      vii. a fifteenth gear mounted thereon for conjoint rotation.

2. The transmission of claim 1, further comprising:
   a. a mechanical front wheel drive shaft having
      i. a sixteenth gear mounted thereon for free rotation,
      ii. an eighth clutch adaptable to connect the sixteenth gear to the mechanical front wheel drive shaft.

3. The transmission of claim 1, wherein the first and fourth gears are in constant meshing engagement.

4. The transmission of claim 3, wherein the second and fifth gears are in constant meshing engagement.

5. The transmission of claim 1, wherein the third gear and the twelfth gear are in constant meshing engagement to provide a reverse range of gear ratios.

6. The transmission of claim 5, wherein the sixth clutch is disposed to transfer power through the transmission in both a reverse and a forward range of gear ratios.

7. The transmission of claim 2, wherein the output shaft and the front wheel drive shaft always rotate conjointly and in opposite directions in both the forward and reverse gear ratios when the eighth clutch is engaged.

8. A countershaft transmission comprising:
   a. an input shaft having first and second gears, a first clutch drivingly coupled to the first gear and a torque converter drivingly coupled to the second gear, wherein the first gear is configured to transmit power in a first plurality of forward gear ratios and a plurality of reverse gear ratios and the second gear is configured to transmit power in a second plurality of forward gear ratios;
   b. a first countershaft having third fourth and fifth gears mounted thereon, a second clutch coupled to the third gear, and a third clutch coupled to the fourth gear, wherein the second clutch is only engaged to transmit power in the plurality of reverse gear ratios, and the third clutch is only configured to transmit power in the first and second pluralities of forward gear ratios;
   c. a second countershaft having a sixth, seventh, eighth and ninth gear mounted thereon, and fourth and fifth clutches coupled to the sixth and ninth gears, wherein the fourth and fifth clutches are never simultaneously engaged to transmit power in any forward or reverse gear ratios, but are each configured to transmit power in at least one forward and one reverse gear ratios; and
   d. an output shaft having a tenth, eleventh, twelfth and thirteenth gear mounted thereon as well as a sixth clutch configured to transmit power in at least one forward and one reverse gear ratio that is never simultaneously engaged with either of the fourth and fifth clutches in any forward or reverse gear ratio to transmit power.

9. The transmission of claim 8, wherein the output shaft further includes a seventh clutch configured such that it is never simultaneously engaged with any of the fourth, fifth or sixth clutches to transmit power in any forward or reverse gear ratio, but is configured to transmit power in at least one of the forward and reverse gear ratios.

10. The transmission of claim 9, wherein the first gear is rotationally engaged with one of the second, third and fourth gears to transmit power.

11. The transmission of claim 10, wherein the third gear is configured to continuously mesh with the twelfth gear in all forward and reverse gear ratios, and further wherein the third gear transmits power in the plurality of reverse gear ratios.

* * * * *